United States Patent [19]

Lin

[11] Patent Number: 5,761,250
[45] Date of Patent: Jun. 2, 1998

[54] ITERATIVE FILTERING FREQUENCY ESTIMATOR AND ESTIMATION METHOD

[75] Inventor: Jingdong Lin, Irvine, Calif.

[73] Assignee: Rockwell International Corporation, Newport Beach, Calif.

[21] Appl. No.: 515,403

[22] Filed: Aug. 15, 1995

[51] Int. Cl.[6] .................................................. H04L 27/06
[52] U.S. Cl. ............................... 375/344; 455/67.1
[58] Field of Search .................... 375/344, 350; 455/67.1, 422, 550, 575

[56] References Cited

U.S. PATENT DOCUMENTS 5,077,531  12/1991  Takeuchi et al. ................ 329/304
5,590,158  12/1996  Yamaguchi et al. ............. 375/331

*Primary Examiner*—Young T. Tse

*Attorney, Agent, or Firm*—William C. Cray; Philip K. Yu

[57] ABSTRACT

A method and apparatus for iterative carrier frequency estimation of a base station by a mobile station in a wireless communication system is disclosed. Upon detecting a frequency correction burst ("FCB") signal from the wireless transmission of the base station, the mobile station first buffers the FCB signal and then filters the buffered signal with a bandpass filter to generate a first set of filtered data. After filtering, the first filtered data is again filtered with an auto-regressive filter to generate a corresponding set of second filtered data. With the second filtered data, iterative pole estimation of the AR filter and filtering by the AR filter is made for a predetermined set of iterations to generate a converged pole estimate, which can then be used to derive the carrier frequency of the base station. Also, the mobile station may be further adapted to receive and buffer more than one FCB signals to allow averaging of the derived carrier frequencies based on different pole estimates such that a reliable and accurate carrier frequency is obtained.

17 Claims, 4 Drawing Sheets

ITERATIVE FILTERING FREQUENCY ESTIMATOR AND ESTIMATION METHOD

FIELD OF THE INVENTION

The present invention relates to wireless mobile communication and more specifically relates to carrier frequency acquisition by mobile receivers using iterative frequency estimation.

BACKGROUND OF INVENTION

Wireless communication, particularly cellular communication such as GSM ("the Global System for Mobile communications") or NADC ("North American Digital Cellular Systems"), has become a necessary, if not essential, part of the technology revolution. It has allowed a user to place and receive telephone calls at anywhere and any place through her mobile cellular phone or cordless phone (hereinafter "phone"), irrespective of whether she is in a moving automobile slowly making her way through a traffic jam or in an office building attending a meeting. As long as the user is within a "cell" which is served by a base station, she is always one phone call away from her friends, colleagues or business associates.

What is supposed to be transparent to the user, e.g. the seamless connection and accessibility enjoyed by the user, is always quite problematic and challenging to the engineers and technologists working behind the scene. As the user moves through various cell zones, her phone must constantly perform a few tasks. First, the phone should be able to establish connection, through a handshake phase, with the base station of the serving cell within which the phone is located. Another task is for the phone, after the connection is already established, to monitor the carrier frequencies of the neighboring cells. FIG. 1 illustrates the relationship between the "serving cell" and the "neighboring cells."

The carrier frequency of the base station of the serving cell, while its frequency is nominally known, cannot be accurately acquired when the phone has just moved into a new cell. Therefore, there is a need for the phone to first estimate the carrier frequency of the serving cell base station and gradually improve its estimate to within about 100 Hz of the carrier frequency.

In the handshake phase of the phone, like GSM or NADC, a frequency estimator is generally required to estimate the carrier frequency of a base station for establishing connection. In a typical TDMA ("Time Division Multiple Access") cellular system, the carrier frequency estimation is usually performed on a frequency correction burst ("FCB"), which repeats every 50 bursts. Because of the existence of strong Gaussian noises, strong co-channel and adjacent channel interference and severe fading, a conventional frequency estimator, or a tracking unit like a phase lock loop ("PLL"), generally requires 100 or even more FCBs to obtain a reliable frequency estimation. This approach has been quite unsatisfactory since it results in a much longer establishing period.

Therefore, it would be desirable to have a more efficient and reliable frequency estimator, as well as a frequency estimation method, for estimating the carrier frequency in the wireless environment.

More particularly, it would be desirable to obtain accurate frequency estimation in as little time as possible.

Also, it would be desirable to obtain a more accurate frequency estimation even in the presence of the strong distortions and interferences in the wireless environment.

SUMMARY OF THE PRESENT INVENTION

A method and apparatus for iterative carrier frequency estimation of a base station by a mobile station in a wireless communication system is disclosed. Upon detecting a frequency correction burst ("FCB") signal from the wireless transmission of the base station, the mobile station first buffers the FCB signal and then filters the buffered signal with a bandpass filter to generate a first set of filtered data. After filtering, the first filtered data is again filtered with an auto-regressive filter to generate a corresponding set of second filtered data. With the second filtered data, iterative pole estimation of the AR filter and the filtering with the AR filter are made for a predetermined set of iterations to generate a converged pole estimate, which can then be used to derive the carrier frequency of the base station. Also, the mobile station may be further adapted to receive and buffer more than one FCB signals to allow averaging of the derived carrier frequencies based on different pole estimates such that a reliable and accurate carrier frequency is obtained.

BRIEF DESCRIPTION OF THE DRAWING

Additional objects, features and advantages of the present invention will become apparent to those skilled in the art in the following description, wherein.

DETAILED DESCRIPTION OF THE PREFERRED EMBODIMENT

An iterative frequency estimator for estimating the carrier frequency of the base station in a wireless communication environment is disclosed. More particularly the present invention provides fast and efficient carrier frequency estimation in the wireless environment with strong Gaussian noises, co-channel and adjacent channel interference and fast channel fading. Without utilizing the conventional frequency estimation method, such as the PLL, the present invention employs an iterative filtering method to iteratively process the pre-buffered data, and works reliably with one or more FCB bursts.

In the following description, the present invention is described in terms of algorithms and functional block diagrams, which are the usual means for those skilled in the art to communicate with others similarly skilled in the art. It should be appreciated by those skilled in the art that the present invention is not strictly limited to its symbolic representation herein and those skilled in the art can easily modify the illustrated embodiment to implement the present invention for their particular applications.

Figure 1:
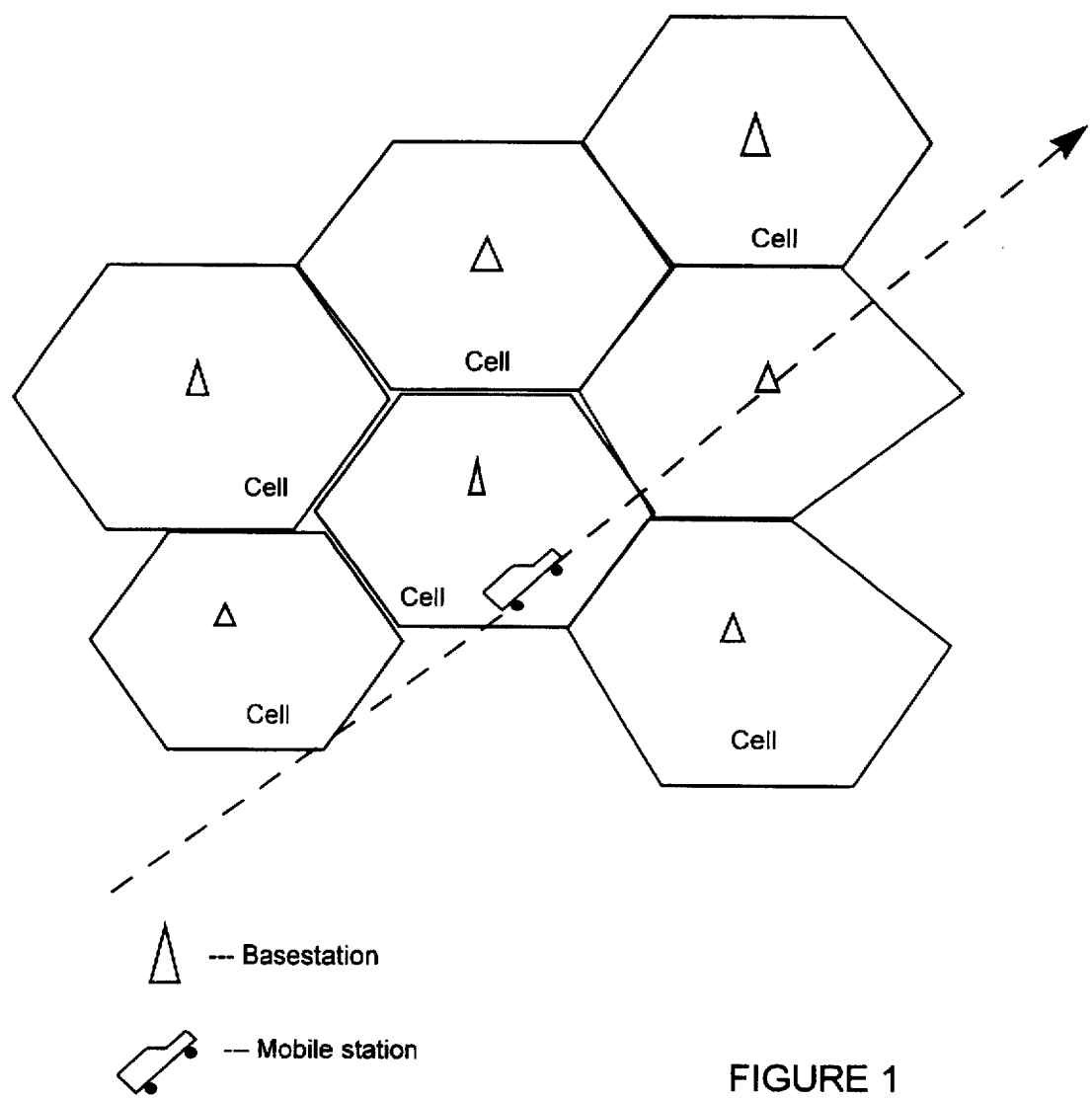
FIG. 1 symbolically shows an area with cellular coverage from different base stations.
Figure 2:
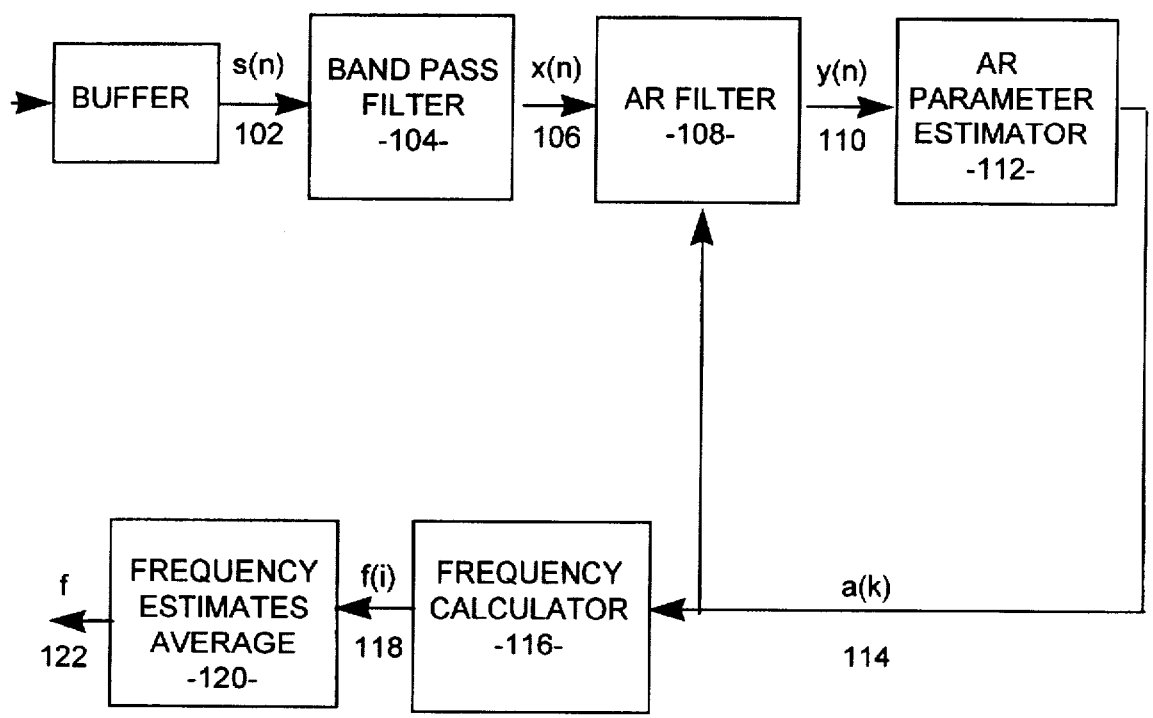
FIG. 2 depicts a first embodiment of an iterative filtering frequency estimator in accordance with the present invention.

With reference to FIG. 2, one embodiment of the iterative filtering frequency estimator 100 in accordance with the present invention is symbolically shown. From the input's end, a bandpass filter (BPF) 104 is coupled to an AR ("Auto Regressive") filter 108. The AR filter 108 is then coupled to an AR parameter estimate unit 112, which applies its output to both the AR filter 108 and a frequency calculate unit 116. The output from the frequency calculate unit is applied to a frequency estimate average unit 120.

The operation of the frequency estimator 100 is now described in more detail. With the base station continuously broadcasting its signals, e.g. microwave signals, the signals are detected and received by the phones within the cell. The broadcast signals begin with a frequency correction burst (FCB), which is a single tone with a frequency unknown to the phone and includes 156 samples, "s(n)", at a sampling rate of 270.833 KHz. The FCB samples, s(n), are received, detected and buffered by the AFC ("Automatic Frequency Correction") unit of the mobile cellular phone.

The buffered signals, s(n) 102, from the FCB burst is first filtered by the BPF 104 to reject the out-band noises and interferences. The BPF 104 thus generates an output, x(n) 106, which is further filtered by the one-pole AR filter 108. It should be noted that a three-pole AR filter can also be used, as can be appreciated by those skilled in the art. Those skilled in the art will appreciate that a one-pole AR filter has the following characteristics:

$$H(z) = \frac{1}{1 - a \cdot z^{-1}},$$

where "a" is an AR parameter or the complex position of the pole and "z" is the variable in z-transform. The output y(n) 110 of the AR filter 108 can be represented by the following equation:

$$y(n) = x(n) + a(k) \cdot y(n-1) \qquad \text{Equation 1}$$

where n=0, 1, 2, . . . 155 and a(k) 114 is the AR parameter of the k-th iteration.

After the filtering, a(k) is re-estimated by the AR parameter estimate unit 112 according to the following equation:

$$a(k+1) = \frac{\frac{1}{N-1} \sum_{n=0}^{N-2} y^*(n) \cdot y(n-1)}{\frac{1}{N} \sum_{n=0}^{N-1} |y(n)|^2} \qquad \text{Equation 2}$$

where k=1, 2, . . . 8 and N=total number of samples in each FCB burst. Note that the symbol "*" stands for the conjugate of a variable.

After a(k) is updated, i.e. next "k", x(n) 106 is re-filtered by the AR filter 108, and a(k) is re-estimated again by using the new y(n) 110. After 8 iterations, e.g., a(1) . . . a(8), are obtained, as implemented in the current embodiment, a(k) will converge, and the frequency estimate f(i) 118 from the current FCB burst can be calculated by the frequency calculate unit 116 according to the following equation:

$$f(i) = \frac{F_s}{2\pi} \angle a(k) \qquad \text{Equation 3}$$

where $F_s$ is the sampling frequency and $\angle a(k)$ represents the Arctangent of a(k).

In practice, however, the accuracy of the estimated carrier frequency f(i) is likely to be effected by various factors in the environment such as adjacent channel and co-channel interferences, noises and fading. To achieve an even better estimate, the process as described above may be applied to one to more than one FCB bursts to obtain more than one estimated f(i)'s, as will be appreciated by those skilled in the art.

With more than one f(i)'s calculated, the two estimates with the nearest values are averaged 120 to obtain the final estimate "f" 122. If only one FCB burst is used, the estimation process may terminate after the frequency calculate unit 116.

Figure 3:
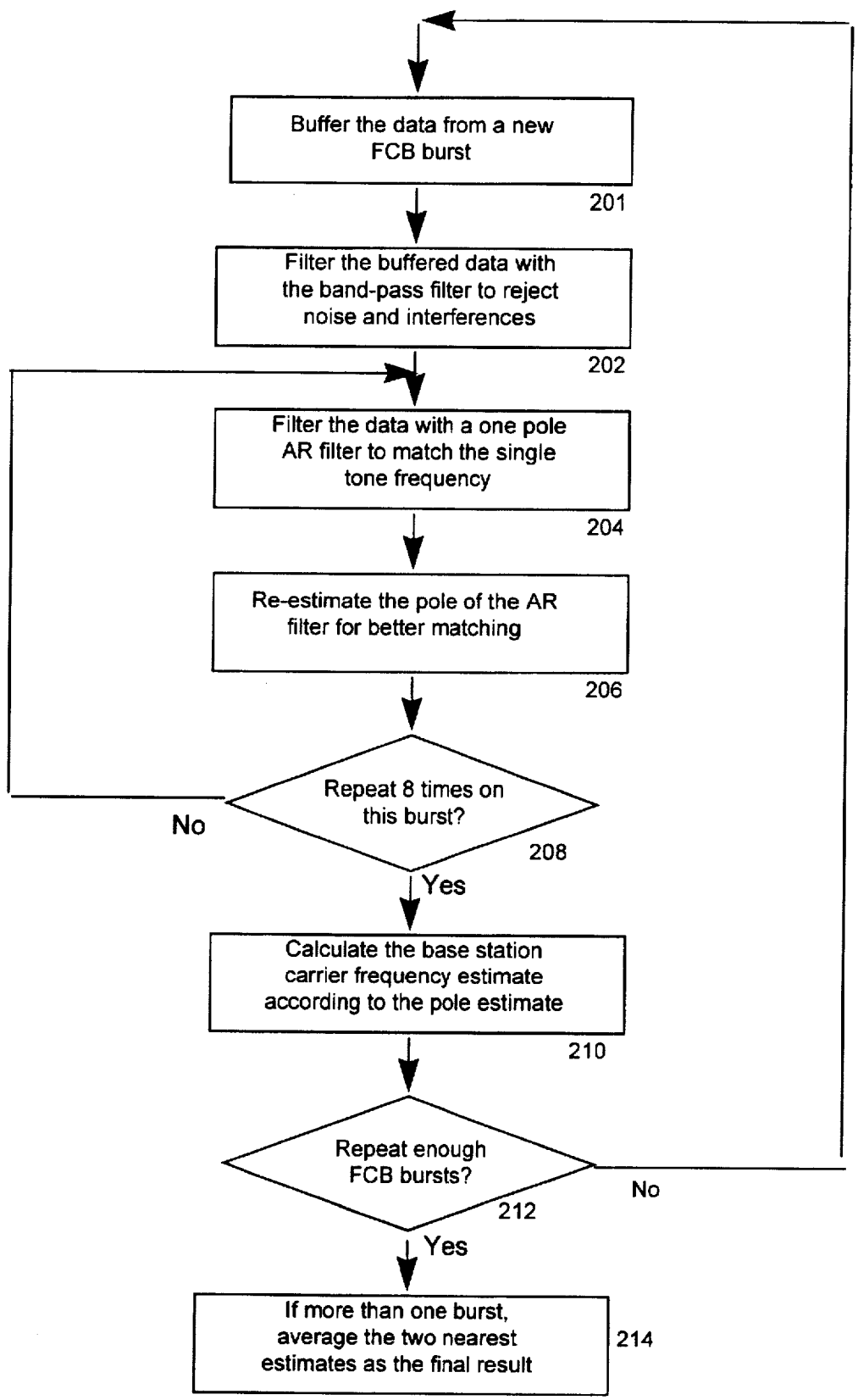
FIG. 3 is a flow chart illustrating the method of iterative filtering frequency estimation in accordance with the present invention.

Reference is now made to FIG. 3, where a flow chart shows the steps of the iterative filtering frequency estimation in accordance with the present invention. First, the data s(n) from the FCB burst is buffered in the memory (201) of the phone. Then, the BPF is employed (preferably an eight-order Butterworth filter) to process the buffered data s(n) to reject out-band noises and interferences (202).

The one-pole AR filter is used to match the single tone frequency of the FCB burst (204) by estimating its pole position. Then, the pole of the AR filter is re-estimated for the next iteration (206). If the number of iteration is less then eight, the buffered data will be re-filtered with the updated AR filter (208). Otherwise, the base station carrier frequency f(i) can be calculated (210).

To obtain optimal estimation, if more than one FCB bursts are processed, the final estimated frequency will be obtained by averaging the two nearest estimates (214). Otherwise, the process may be terminated.

Figure 4:
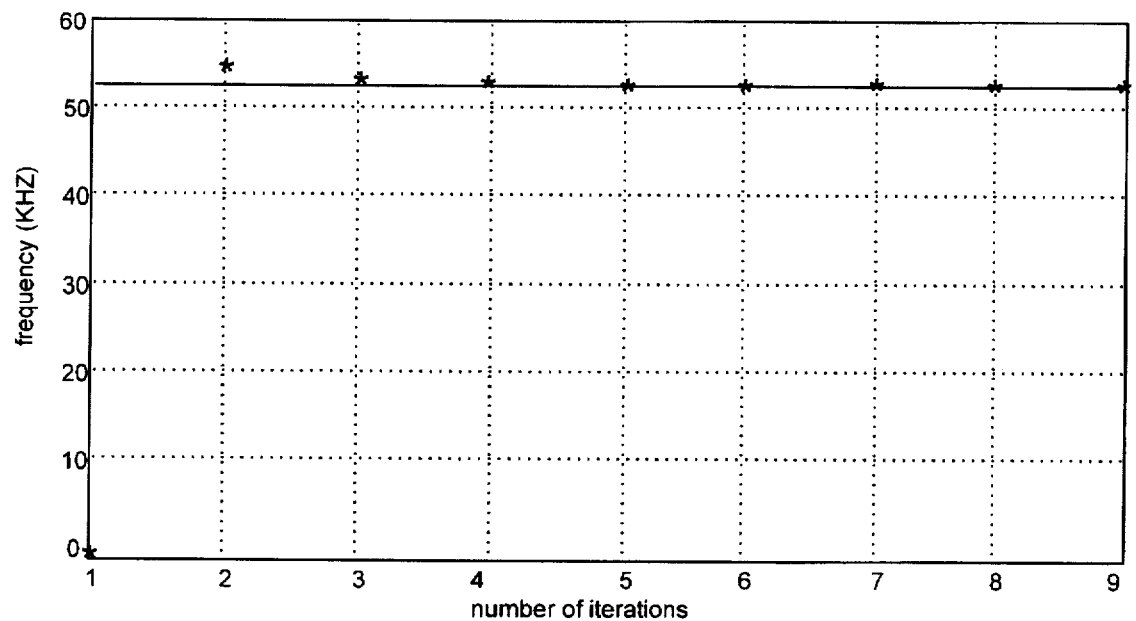
FIG. 4 is a simulation showing the convergence of the estimated frequency $a(k)$ in iterations.

In FIG. 4, convergence of a(k) after the beginning has been demonstrated in simulation. Note that a(k) begins with 0 KHz at the first iteration and quickly converges to the target frequency at the 8th iteration.

In an exemplary implementation, the present invention may be utilized in a GSM handset. The single tone in the FCB burst can be anywhere between 37.7 KHz to 97.7 KHz. The carrier frequency is 900 MHz and sampling rate is 270 KHz. An eight-order Butterworth filter with the pass-band from 37.7 KHz to 97.7 KHz is used to process the data (104 and 202). Four FCB bursts are used to estimate the carrier frequency and take the average (120 and 214). The percentage that the final estimate is within 100 Hz of the true frequency has been shown to be over 96% in all situations.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

I claim:

1. A method of estimating a carrier frequency of a base station in a wireless communication system by a mobile station, said base station broadcasting wireless signals for said mobile station to detect a time location of a predetermined complex signal within each burst of said wireless signals, comprising the steps of:

a) buffering said predetermined complex signal from the wireless signals received from said base station to generate buffered data;

b) band-pass filtering said buffered data from said Step (a) with a predetermined bandwidth to generate a predetermined number of first filtered data ("x(n)");

c) filtering said predetermined number of first filtered data ("x(n)") from said Step (b) with an auto-regressive ("AR") filter to generate a predetermined number of second filtered data ("y(n)") according to the following equation:

$$y(n) = x(n) + a(k) \cdot y(n-1),$$

where x(n) is first filtered data, y(n) is second filtered data, a(k) is an AR parameter of k-th iteration with "n" being incremented from 0 to a predetermined number;

d) estimating a first pole estimation, a(k+1), of said AR filter by using said predetermined number of second filtered data ("y(n)") from said Step (c) according to the following equation:

$$a(k+1) = \frac{\frac{1}{N-1}\sum_{n=0}^{N-2} y^*(n) \cdot y(n-1)}{\frac{1}{N}\sum_{n=0}^{N-1} |y(n)|^2},$$

where N is a predetermined number of samples within each burst;

e) updating said first pole estimation a(k+1) by repeating, from said Step (c) to Step (d), "k" iterations to obtain a final pole estimation, and f) calculating said carrier frequency using said final pole estimation from said Step (e) according to following equation:

$$f(i) = \frac{F_s}{2\pi} \angle a(k),$$

where "$F_s$" is a predetermined sampling frequency of said wireless signals and "$\angle a(k)$" represents an arctangent of a(k).

2. A method according to claim 1, further comprising:

g) receiving a plurality of bursts of said predetermined complex signals from the base station to obtain a corresponding plurality of carrier frequencies;

h) from within said plurality of carrier frequencies, finding a predetermined number of closest carrier frequencies; and l) averaging said predetermined number of closest carrier frequencies to estimate a second carrier frequency.

3. A method according to claim 2, wherein 4 bursts of said predetermined complex signals are received from said base station to obtain 4 carrier frequencies and 2 closest carrier frequencies are averaged.

4. A method according to claim 2, wherein said predetermined complex signal is a complex tone representative of a frequency correction burst ("FCB").

5. A method according to claim 2, wherein said y(n) in said Step (c) is obtained using either one of two-pole AR filter or three-pole AR filter.

6. A method according to claim 2, wherein "n" is incremented from 0 to 155 from said Step (c) to said Step (e).

7. A method according to claim 2, wherein said Step (c) to said Step (e) is iterated k=8 times.

8. A method according to claim 1, wherein said y(n) in said Step (c) is obtained using either one of two-pole AR filter or three-pole AR filter.

9. A method according to claim 8, wherein said predetermined complex signal is a complex tone representative of a frequency correction burst ("FCB").

10. A method according to claim 1, wherein said "n" is incremented from 0 to 155 from said Step (c) to said Step (e).

11. A method according to claim 10, wherein said predetermined complex signal is a complex tone representative of a frequency correction burst ("FCB").

12. A method according to claim 1, wherein said Step (c) to said Step (e) is iterated k=8 times.

13. A method according to claim 12, wherein said predetermined complex signal is a complex tone representative of a frequency correction burst ("FCB").

14. A method according to claim 1, wherein said predetermined complex signal is a complex tone representative of a frequency correction burst ("FCB").

15. An apparatus for estimating a carrier frequency of a base station in a wireless communication system by a mobile station, said base station broadcasting wireless signals for said mobile station to detect a time location of a predetermined complex signal within each burst of said wireless signals, said apparatus comprising:

buffering means for buffering said predetermined complex signal from the wireless signals received from said base station to generate buffered data;

bandpass filtering means for filtering said buffered data from said buffering means with a predetermined bandwidth to generate a predetermined number of first filtered data ("x(n)");

AR filtering means for filtering said predetermined number of first filtered data ("x(n)") from said bandpass filtering means to generate a predetermined number of second filtered data ("y(n)") according to the following equation:

$$y(n)=x(n)+a(k)\cdot y(n-1),$$

where x(n) is first filtered data, y(n) is second filtered data, a(k) is an AR parameter of k-th iteration with "n" being incremented from 0 to a predetermined number;

AR parameter estimating means for, through at least one iteration, obtaining a first pole estimation a(k+1) of said AR filtering means by using said predetermined number of second filtered data ("y(n)") from said AR filtering means according to the following equation:

$$a(k+1) = \frac{\frac{1}{N-1}\sum_{n=0}^{N-2} y^*(n) \cdot y(n-1)}{\frac{1}{N}\sum_{n=0}^{N-1} |y(n)|^2},$$

where "N" is a predetermined number of samples within each burst; and frequency calculating means for calculating said carrier frequency using said pole estimation from said AR parameter estimating means after said at least one iteration according to following equation:

$$f(i) = \frac{F_s}{2\pi} \angle a(k),$$

where "$F_s$" is a predetermined sampling frequency of said wireless signals and "$\angle a(k)$" represents an arctangent of a(k).

16. The apparatus according to claim 15, wherein said buffering means buffers a plurality of bursts of said predetermined complex signals from the base station and said frequency calculating means calculates a corresponding plurality of carrier frequencies, further comprising:

frequency estimate averaging means for averaging a predetermined number of closest carrier frequencies to obtain a final carrier frequency.

17. An apparatus according to claim 15, wherein said y(n) is obtained by either one of a two-pole AR filter or a three-pole AR filter.

* * * * *